(12) United States Patent
Gupta et al.

(10) Patent No.: US 10,783,525 B1
(45) Date of Patent: Sep. 22, 2020

(54) USER ANNOTATED FEEDBACK

(71) Applicant: INTUIT INC., Mountain View, CA (US)

(72) Inventors: Varun Gupta, Mississauga (CA); Andrew Stakoun, Mississauga (CA); Peng Fei Wang, Mississagua (CA)

(73) Assignee: INTUIT, INC., Mountain View, CA (US)

( * ) Notice: Subject to any disclaimer, the term of this patent is extended or adjusted under 35 U.S.C. 154(b) by 640 days.

(21) Appl. No.: 15/492,239

(22) Filed: Apr. 20, 2017

(51) Int. Cl.
| | |
|---|---|
| G06Q 30/00 | (2012.01) |
| G06F 16/35 | (2019.01) |
| G06F 40/30 | (2020.01) |
| G06F 40/58 | (2020.01) |
| G06F 40/166 | (2020.01) |

(52) U.S. Cl.
CPC ........... *G06Q 30/016* (2013.01); *G06F 16/35* (2019.01); *G06F 40/166* (2020.01); *G06F 40/30* (2020.01); *G06F 40/58* (2020.01)

(58) Field of Classification Search
None
See application file for complete search history.

(56) References Cited

U.S. PATENT DOCUMENTS

| | | | | |
|---|---|---|---|---|
| 8,364,467 B1* | 1/2013 | Bowman | ................. | G06F 16/35 704/9 |
| 9,247,066 B1* | 1/2016 | Stec | .................... | H04M 3/5235 |
| 9,804,730 B2* | 10/2017 | Lefor | ................... | G06F 3/0481 |
| 2012/0317545 A1* | 12/2012 | Chandra | ................... | G06F 8/70 717/110 |
| 2013/0074051 A1* | 3/2013 | Freeman | ............. | G06F 11/3438 717/130 |
| 2014/0059139 A1* | 2/2014 | Filev | ...................... | G06Q 50/01 709/205 |
| 2014/0067975 A1* | 3/2014 | Ding | ....................... | H04L 51/12 709/206 |
| 2014/0379818 A1* | 12/2014 | Cudak | ..................... | H04L 51/16 709/206 |
| 2016/0011925 A1* | 1/2016 | Kulkarni | ............. | H04L 43/0817 714/57 |
| 2017/0108995 A1* | 4/2017 | Ali | ........................ | G06F 3/0481 |
| 2017/0257459 A1* | 9/2017 | Vaidyanathan | ......... | H04L 67/42 |

OTHER PUBLICATIONS

How feedback helps you develop better software: insights fro the Jira Mobile team; www.atlassian.com; Jun. 8, 2016 (Year: 2016).*

* cited by examiner

*Primary Examiner* — Dennis W Ruhl
(74) *Attorney, Agent, or Firm* — Patterson + Sheridan, LLP

(57) ABSTRACT

Techniques are disclosed for a bi-directional notification service. The techniques disclosed herein notify a user of an application in real-time based on a context of the application. A given notification may require a particular context before the notification can be presented to the user. The notification service also provides a channel for a user to provide feedback regarding the application. Multiple users may submit feedback messages each of which are enriched with contextual information related to the application at the time the message is submitted. Each feedback message is assigned to a category based on the content of the feedback message and contextual information of the notification. A heat map may be generated to visualize a number of feedback messages associated with one or more categories.

20 Claims, 8 Drawing Sheets

USER ANNOTATED FEEDBACK

BACKGROUND

Field

Embodiments presented herein generally relate to techniques for determining the applicability of a notification. More specifically, embodiments presented herein provide techniques for managing real-time notifications to a user based on a context of the user.

Description of the Related Art

Many software products notify a user when an updated version of that software product is available. Such a notification is typically sent to each instance of the software product. For example, a developer of a software product may push a notification to each instance of the software product that has been sold and installed on a client computer. When a user opens the software product on the client computer, a notification may be presented to inform the user that an updated version of the product is available. This notification will be shown to each user of the software product regardless of whether the information in the notification is relevant to them.

Another notification may indicate to the user that there is a problem with a particular page of the software product. In that case, if the notification is presented to the user when the software product is opened, the user may not access that page until a later time and may forget about the notification.

Some software products provide a user with an opportunity to submit feedback or comments related to the software product. A developer of the software product may be able to determine an issue raised by the feedback. However, the developer may not know which part of the software product the feedback is applicable to. Thus, the developer may be aware of the issue but may not know where to fix the issue.

SUMMARY

One embodiment disclosed herein includes a method for managing user feedback. The method may generally include receiving a feedback message and data associated with the feedback message. The method may also include identifying a category, from a plurality of categories, related to the feedback message based on a content of the feedback message and the data associated with the feedback message. The method may also include aggregating the feedback message with a plurality of feedback messages from a plurality of users. The method may also include determining a number of feedback messages assigned to each of the plurality of categories from the aggregated feedback messages.

Another embodiment presented herein includes a computer-readable storage medium storing instructions, which, when executed on a processor, perform an operation to manage user feedback. The operation may generally include receiving a feedback message and data associated with the feedback message. The operation may also include identifying a category, from a plurality of categories, related to the feedback message based on a content of the feedback message and the data associated with the feedback message. The operation may also include aggregating the feedback message with a plurality of feedback messages from a plurality of users. The operation may also include determining a number of feedback messages assigned to each of the plurality of categories from the aggregated feedback messages.

Still another embodiment presented herein includes a system having a processor and a memory hosting an application, which, when executed on the processor performs an operation to manage user feedback. The operation may generally include receiving a feedback message and data associated with the feedback message. The operation may also include identifying a category, from a plurality of categories, related to the feedback message based on a content of the feedback message and the data associated with the feedback message. The operation may also include aggregating the feedback message with a plurality of feedback messages from a plurality of users. The operation may also include determining a number of feedback messages assigned to each of the plurality of categories from the aggregated feedback messages.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
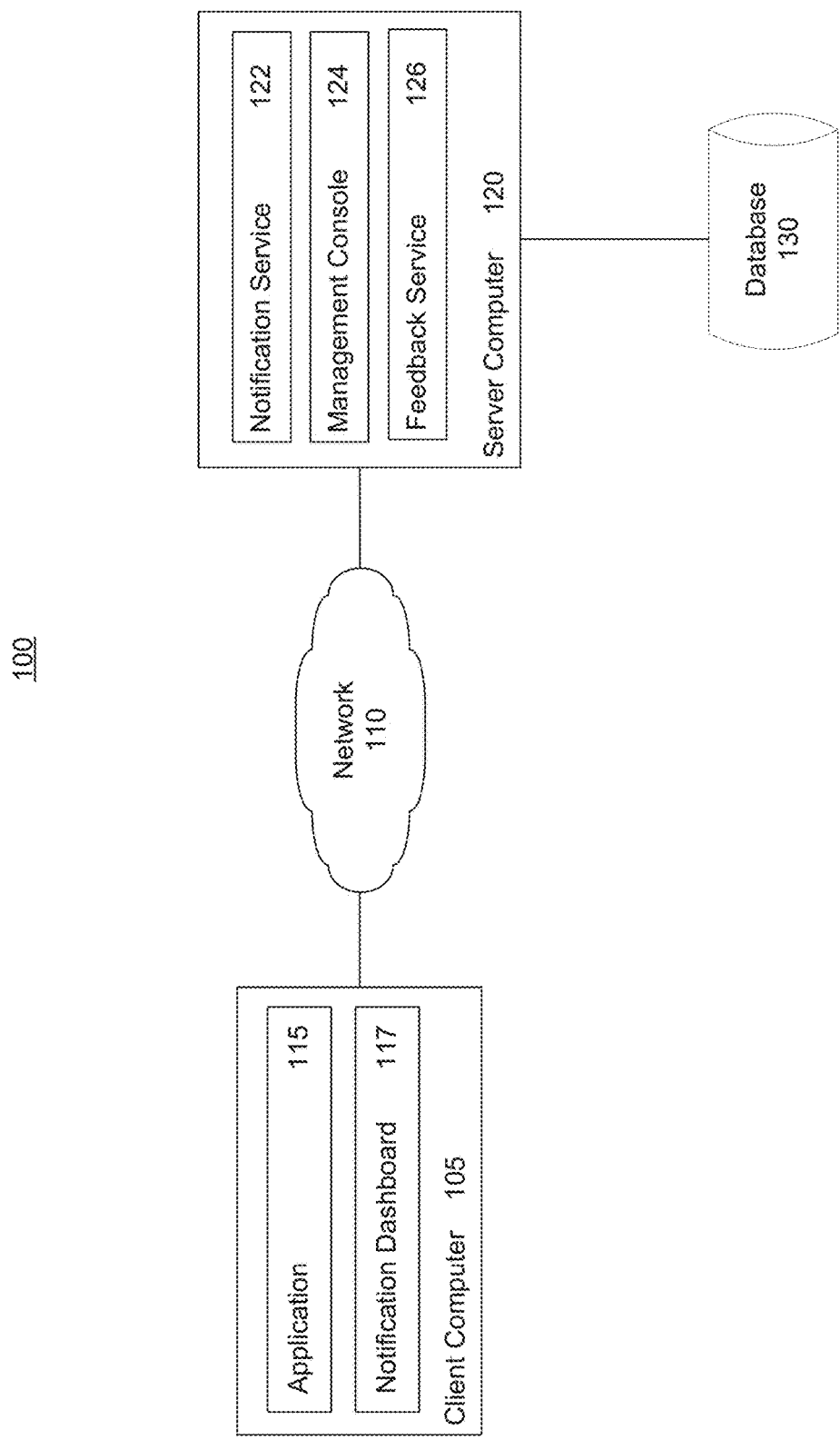
FIG. 1 illustrates an example computing environment, according to one embodiment.

Embodiments presented herein provide techniques for notifying a user of an application based on conditions of the notification. More specifically, embodiments presented herein provide techniques for notifying a particular group of users based on contextual information related to the application.

To notify a user in real-time, an application may receive a notification from a management console. The notification may include one or more conditions related to the application and the user. Upon receiving the notification, the application may determine whether the content of the notification is relevant to the user. Upon determining that the notification applies to the user, the notification may be displayed to the user in a notification dashboard.

Various types of notifications may be generated by a developer. Some notifications may be presented to a user upon launching a software application. Such a notification is an application level notification because it relates to the overall application. For example, the notification may indicate that an updated version of the desktop application is available.

Other notifications may be form-level notifications that only apply to a particular page or form of the application. A form-level application may inform a user of new features in the application or features that are not yet supported by the application. For example, in a tax preparation application, a notification may inform a user of a new regulation not yet addressed by the application. The regulation may apply only to a particular type of tax form. In that case, the notification is a form-level notification.

Other notifications are field-level notifications that may only apply to a particular field within a page or form. For example, the field-level notification may apply to the input format of a social security number on a tax form. The content of a field-level notification may be more specific than an application level notification and form-level notification.

In some cases, a form-level notification or a field-level notification is presented to a user upon launching the application. However, because a period of time may have elapsed between the user launching the application and working on the form or field to which the notification applies, the user may forget about the notification. Thus, it is advantageous to present the notification to the user in real-time when the content is most relevant to the user.

Similarly, a given notification may not apply to a user, but may still be presented to the user upon launching the application. For example, a notification may relate to a particular tax form within the application. Even if the user does not open that particular form, the user may receive the notification upon startup of the application. Thus, the user may not receive a notification in real-time when the notification is most relevant to the user and may receive notifications that are irrelevant to the user.

Advantageously, embodiments disclosed herein provide techniques for presenting a notification to a user in real-time based on contextual information related to an application. As discussed herein, notifications may be generated for a particular user or group or users at a time when the information presented by the notification is most relevant and applicable to each user. The embodiments disclosed also provide techniques for collecting feedback and generating a heat map based on a context of the application, which may allow developers to quickly identify and address an issue affecting multiple users of the application.

FIG. 1 illustrates an example computing environment 100, according to one embodiment. As shown, the computing environment 100 includes a client computer 105, a network 110, a server computer 120, and a database 130. Network 110 may be a physical or wireless network.

As shown, client computer 105 includes an application 115 and a notification dashboard 117 and the server 120 includes a notification service 122, a management console 124 and a feedback service 126. Application 115 may be a tax preparation software application. Management console 124 may be used by a developer of the application 115 to generate one or more notifications regarding application 115. For example, a developer may create a message to notify a user that an updated version of the application 115 is available and can be downloaded. The notification may inform the user that a compatibility issue may occur unless the updated version of the application 115 is installed on the client computer 105.

Once a notification is created using the management console 124, the notification service 122 may store the notification in the database 130 or send the notification to the application 115. The application 115 may send a request to the notification service 122 for notifications stored in the database 130 upon launching of the application 115. The application 115 may also request notifications at regular intervals of time (e.g., 60 second intervals). In some embodiments, a user may manually request additional notifications.

Upon receiving such a request, the notification service 122 may provide one or more notifications generated by a user through the management console 124 to the application 115. The one or more notifications provided include any notification generated since a previous request was received by the notification service 122. The notification service 122 may record a time the request is received as well as a notification ID and a time the notification is received. The notification service 122 may use the notification ID and time the notification is received to determine whether the notification was generated since the previous request was received.

Each notification may provide real-time information to a user of the application 115 as the information becomes relevant to the user based on contextual information related to the application 115. For example, a form-level notification that applies to a particular tax form may not be relevant to the user until the user begins working on that tax form. Thus, the form-level notification may be presented to the user upon opening the particular tax form to which the notification applies. Similarly, a field-level notification related to a particular field on the tax form, may be presented to the user only upon interacting with that particular field, rather than when the tax form is opened.

A given notification may include message data, context data, rule data and an application action. Message data includes the content of the notification (i.e., information to be conveyed to the user). Context data may include contextual information related to the application. The contextual information may specify a particular page or portion of the application that the notification applies to and is to be opened in the application before the notification is displayed to the user. The given notification may also include a unique ID. Upon the user navigating to that page, the notification may be displayed to the user in the notification dashboard 117.

As an example, the context data of the notification may require a Personal Tax Form T545 to be opened using the application 115. In such a case, the notification dashboard 117 does not display the notification to the user until the Personal Tax Form T545 is opened using the application 115. The context data may also limit the notification to be displayed to the user only when the user begins to enter data into a particular filed in the specified form (e.g. an address field in Form T545).

The rule data may include one or more rules which further limit when the notification is displayed to the user. For example, a rule may provide that the notification be displayed if the user is working on a personal tax return, but not if the user is working on a business tax return.

The notification dashboard 117 may provide a user interface which can display the notification while the user interacts with application 115. Based on the context data and rule data in a particular notification, a notification may not be displayed to the user. For example, the context data of the notification may require the Personal Tax Form T545 to be open in the application 115. If the user does not open the Personal Tax Form T545 using the application 115, that notification is not displayed to the user. However, the user may use the notification dashboard 117 to view all notifications whether or not a given notification has been displayed to the user.

Upon determining the context data and rule data of a particular notification is satisfied, the notification dashboard 117 may display that notification to the user. Once a notification is displayed, the notification dashboard 117 may record an ID of that notification. When a subsequent notification is received, the notification dashboard 117 may obtain an ID of the subsequent notification and compare that ID to IDs of previously displayed notifications. If the notification dashboard 117 has previously recorded the ID of the subsequent notification, the given subsequent may not be displayed to the user.

In one embodiment, a feedback console of the application 115 provides a mechanism for a user to provide feedback regarding the application 115 to the server computer 120. For example, a user of application 115 may find a problem while working in application 115. In such a case, the user may inform a developer of the problem by providing a description of the problem in a feedback message. At a point in time when the user sends a feedback message, the application 115 may obtain contextual information related to the application 115. The contextual information may include a tax form or a particular field within the form that the user is working on when the feedback message is submitted. Upon submission of the feedback message, the application 115 may include the context information with the feedback message. The feedback message may also contain information related to the rules of a notification.

Feedback messages from a plurality of users, as well as any related context and rule data, may be received and collected by the feedback service 126 on the server computer 120. Each feedback message may include message data, context data and rule data. The message data, context data and rule data of each feedback message may be associated with an identity of a corresponding user who submitted the message and stored in database 130.

The feedback service 126 may generate a heat map based on the message data and context data. To do so, the feedback service 126 may identify one or more keywords in each feedback message. Based on the keywords and context data, the feedback service 126 may assign each feedback message to a category. The heat map may provide a visualization of a number of messages associated with each category.

The categories, for example, may include "link" (e.g., indicating an error with a link provided on the tax form), "feedback tool" (e.g., indicating an issue with the feedback tool of the application), "update" (e.g., indicating an error occurred while updating the application), etc. Once each feedback message is assigned to a category, the feedback service 126 may generate a heat map. The heat map may include a block for each category. A size and color of each block may correspond to the number of feedback messages assigned to the respective category. Thus, based on a number of messages assigned to a given category, the block corresponding to that category may be a different size and/or color than other blocks in the heat map.

Figure 6:
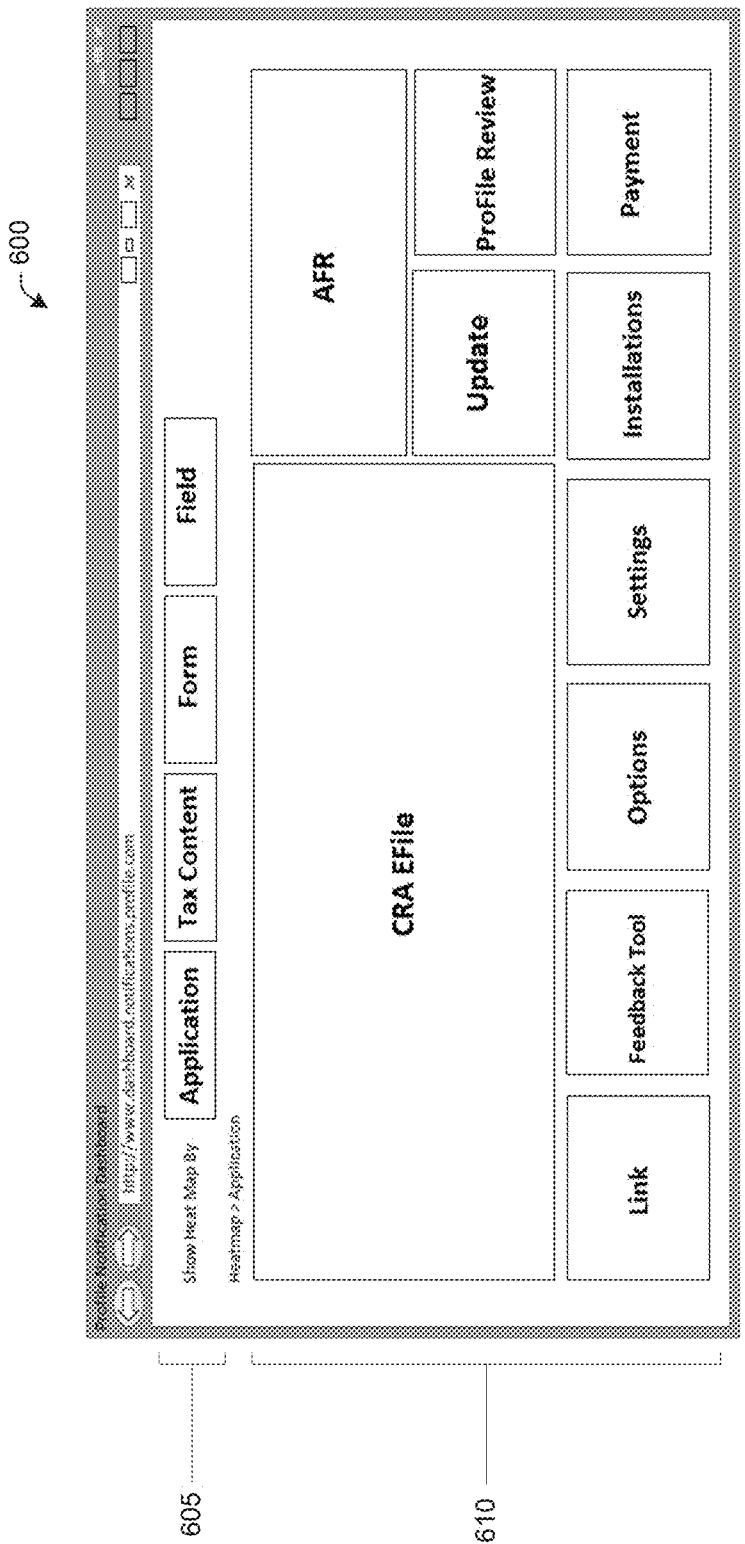
FIG. 6 illustrates a first level of a feedback dashboard based on user feedback, according to one embodiment.
Figure 7:
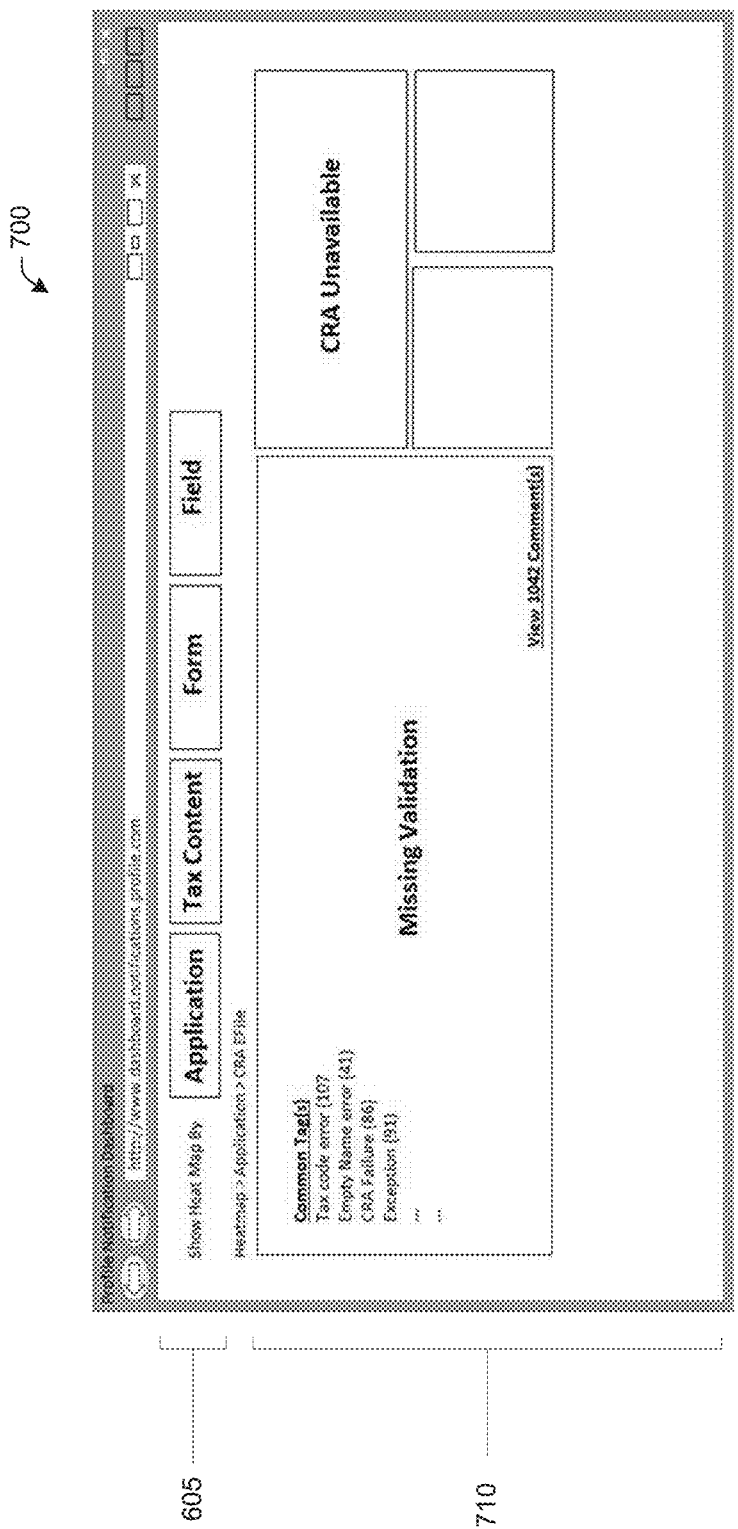
FIG. 7 illustrates a second level of a feedback dashboard based on user feedback, according to one embodiment.

The management console 124 provides a user interface for a developer of application 115 to view the heat map. The user interface in which the developer can view the heat map may provide a feedback dashboard as illustrated in FIGS. 6 and 7. The developer can use the management console to interact with each block of the heat map. The heat map may be used by the developer to identify specific issues raised in the feedback messages.

The application 115 may provide a channel for a user to communicate with another user who experienced an issue similar to that of the user. The notification dashboard 117 may determine whether another user experienced a similar issue based on a feedback message submitted by the other user and contextual information related to the application of the other user at the time the feedback message was submitted.

Figure 2:
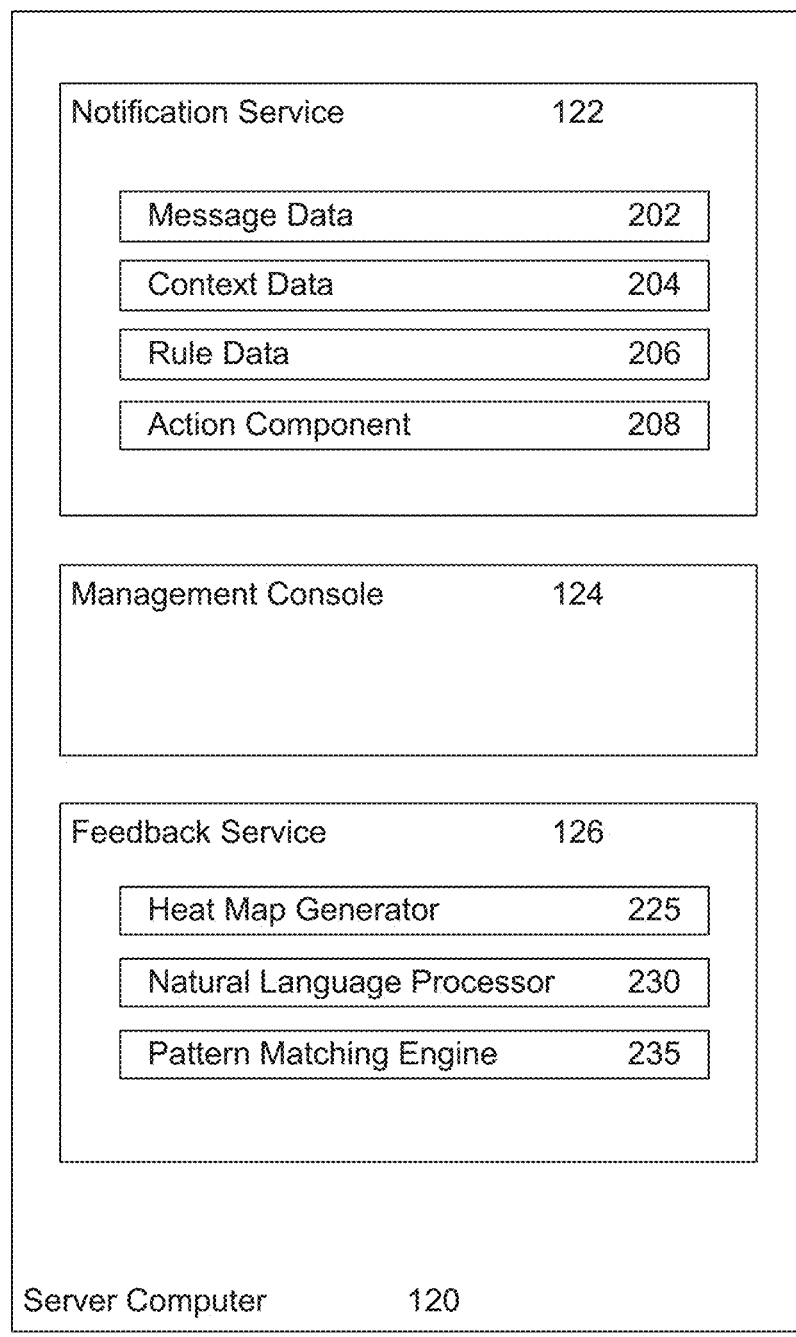
FIG. 2 illustrates a server computer configured to notify users and to receive feedback from the users, according to one embodiment.

FIG. 2 illustrates a server computer 120 configured to notify users and to receive feedback from the users, according to one embodiment. As shown, the notification service 122 includes message data 202, context data 204, rule data 206 and an action component 208. Management console 124 may be used by a developer of a desktop application to generate a notification for a user of the application.

A given notification may include message data 202, context data 204 and rule data 206. The message data 202 may include the content of the notification. The context data 204 may include contextual information related to the application. As discussed, the contextual information of the notification may define when the notification is displayed to a user of application 115. For example, the contextual information may provide that that the notification should not be presented to the user until current contextual information related to the application 115 matches the context data 204 of the notification. The developer of the notification may input the context data 204 for the notification into the management console 124. The context data 204 may also be determined by the notification service 122 based on the message data 202. For example, the notification service 122 may determine the context data 204 for a notification based on keywords identified in the message.

The rule data 206 may include criteria under which the notification can be presented to a user. For example, the rule data 206 may specify a particular operating system running on a client computer, a location of a user (e.g., a state or region), whether the user owns a business, etc. In the case of tax preparation software, the rule data 206 may specify a type of tax return the user is working on (e.g., personal or business), a type of business, an extent of revenue of the business, an inventory of a business, etc.

Once a notification is generated using the management console 124, the notification service 122 may store the notification including the message data 202, context data 204 and rule data 206 in a database. Upon receiving a request from an application 115 on a client computer, the notification service sends one or more notifications to the application 115. The notifications sent to the application 115 may include any notification generated in the management console since a previous request from the application. That is, the application 115 may request notifications at regular intervals of time (e.g., 60 seconds). Thus, in response to a request, the notification service 122 may send all notifications generated during the most recent time interval.

The action component 208 may determine an action to be taken based on a notification generated in the management console. The action may be included with and presented to the user as part of the notification. For example, a notification that indicates an updated version of the application 115 is required may include a link to automatically update the application to the updated version of the application. The user can click the link in the notification to begin the software update. In the tax preparation software example, when the user clicks on the link, the application 115 may import data from a previously completed tax form.

An action may also provide an avenue for the user of the application 115 to connect with other users who are in a similar situation. For example, the action may include a link to open a chat window so that the user can discuss an issue with other users and attempt to resolve that issue. The user of the application 115 may be connected to a single user or a group of users. The other users may be identified based on a context of their application 115 being similar to that of the user, feedback received from the other users being similar to that received from the user, etc. The action may also connect the user to customer support related to the application 115. The application may perform the action automatically or may require action by the user such as clicking on a link.

A feedback console of the desktop application 115 provides a channel for a user to submit feedback regarding the application 115. For example, if a user encounters an issue while using the application 115, the user may inform the developer of the application 115 by submitting a feedback message. The issue may include a problem with a particular field of a form that will not accept a particular input (e.g., the field asks for a social security number but only accepts letters). The channel can also be used to provide suggestions to the developer. For example, a user may recognize that information required by one form is identical to information required by another form. In that case, the user can use the feedback channel to suggest that once the information is input into one form, that information can be automatically populated into the other form.

When a user submits a feedback message, the feedback service 126 on the server computer 120 may receive that message as well as feedback messages from a plurality of other users. As illustrated, feedback service 126 includes a heat map generator 225, a natural language processor 230, and a pattern matching engine 235.

The natural language processor 230 may analyze each feedback message received by the feedback service 126 to identify keywords in each message. The keywords are used to determine a category to which each feedback message is assigned. The keywords may be single words or phrases that identify, for example, a component of the application 115 and information about the component (e.g., that the component is not working). As an example, the keywords may include "desktop," "problem," "not working" or "does not work," etc. The categories to which feedback messages are assigned may include "ProFile Review" (e.g., indicating an issue with a profile of a user), "payment" (e.g., indicating an issue with submitting a payment for services provided by the application), "installations" (e.g., indicating an issue during installation of a software update), etc.

To identify keywords, the natural language processor 230 may remove any filler words from the feedback messages. Filler words may include indefinite articles, definite articles, pronouns, conjunctions, etc. The filler words are removed because they do not contribute to classifying the message or generating the heat map. The words remaining once the filler words are removed may be keywords.

For example, a user may submit a feedback message that states: "The ProFile application is not working on my desktop." In that case, the natural language processor 230 removes the filler words of "The," "is," "on," and "my." This leaves the keywords: "ProFile," "application," "not working," and "desktop." The keywords may be used by the pattern matching engine 235 to assign a category to the message.

The natural language processor 230 may also determine a language in which each feedback message was generated. For consistency and to assign each message properly, the messages may be converted to a common language. For example, some users may submit feedback messages in French while the common language is English. In that case, the natural language processor 230 may translate all messages in French to English.

The heat map generator 225 creates a heat map based on a number of feedback messages assigned to each category. The heat map may provide a visualization of each category and a number of messages assigned to each. For example, the heat map may comprise a block for each category. A size of each block may be based on a number of messages assigned to a corresponding category. For example, a block corresponding to the category that is assigned the most feedback messages is larger than a block corresponding to a category assigned a smaller number.

As an alternative to determining a category based on keywords, a machine learning model may be trained to predict a category to which each feedback message is assigned. An example data set including feedback messages and a corresponding category may be created by a developer. Keywords may be obtained from the example feedback messages and used to train the machine learning model. For example, the machine learning model may identify correlations between keywords in the feedback messages and a category to which it is assigned. Over time, the machine learning model may be automatically updated with keywords from feedback messages and a corresponding category.

Figure 3:
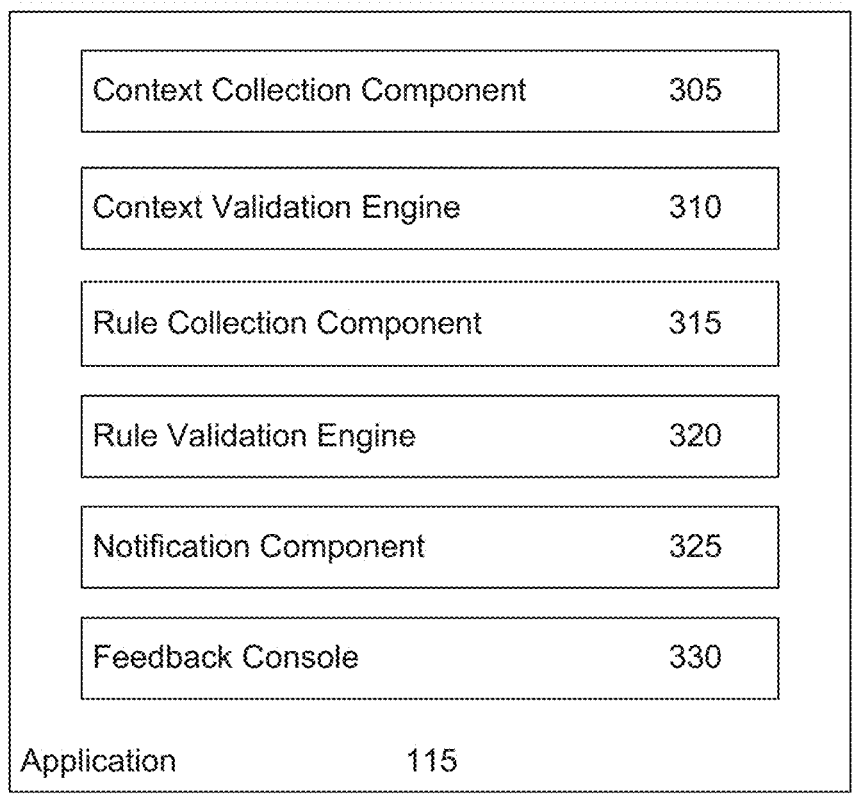
FIG. 3 illustrates an application configured to present a notification from a user and collect feedback from the user, according to one embodiment.

FIG. 3 illustrates an application 115 configured to present a notification from a user and collect feedback from the user, according to one embodiment. As illustrated, the application 115 includes a context collection component 305, a context validation engine 310, a rule collection component 315, a rule validation engine 320, a notification component 325 and a feedback console 330.

The notification component 325 may send requests to a notification service, such as notification service 122 with respect to FIG. 2. The requests may be sent at regular intervals of time (e.g., every 60 seconds). Each request may ask for all notifications generated during the time interval or since a previous request was sent by the notification component 325. As discussed above, each notification may include message data, context data, and rule data.

When the application receives a notification, the context collection component 305 may obtain a current context of the application 115. For example, the context collection component 305 may determine a tax form that is open by the application 115. The context collection component 305 may also determine a field within the form into which the user is inputting text.

The context validation engine 310 may analyze the context data included in the notification with the context of the application obtained by the context collection component 305. For example, the context validation engine 310 may determine whether a current context of the application satisfies a context required by the notification. If so, the context validation engine 310 may indicate to the notification component 325 that the notification is applicable to the current context of the application. If the current context of the application does not satisfy a context required by the notification, the context validation engine 310 may continually or periodically obtain a current context of the application 115 and analyze that context against the context required by the notification.

The rule collection component 315 may obtain information related to the rules in the received notification. For example, the rule collection component 315 may determine a type of form open in the application (e.g., personal or business tax form), an operating system of the client computer, a software version of the operating system, and a software version of the application 115. If a rule limits an applicability of a notification to users working on business tax returns, the rule may further limit the notification to a particular type of business or industry, a specific level of revenue of the business, a type of inventory of the business, etc. In a case where the context limits the applicability of the notification to a particular field, a rule may require a particular value or type of input (e.g., letter vs. number).

The rule validation engine 320 compares the rule data from the received notification with the information obtained by the rule collection component 315 to determine if the rule(s) in the notification are satisfied. If so, the rule validation engine 320 may indicate to the notification component 325 that rule or rules of the notification is satisfied and the notification can be displayed to the user.

Once the context and rules are satisfied for a given notification, the notification component 325 may send the notification to the notification dashboard (e.g., notification dashboard 117 with respect to FIG. 1). Once received, the notification dashboard displays the notification to the user.

The feedback console 330 provides a user interface for a user of the application to provide feedback to a developer of the application. The feedback console 330 may obtain a context of the application at the time the feedback message is sent from the context collection component 305. One or more rules applicable to the feedback message at the time the message is sent may also be determined by the rule collection component 315. The context of the application and the applicable rules applicable to the feedback message are included in the feedback message and sent to the feedback dashboard, such as feedback service 126.

Figure 4:
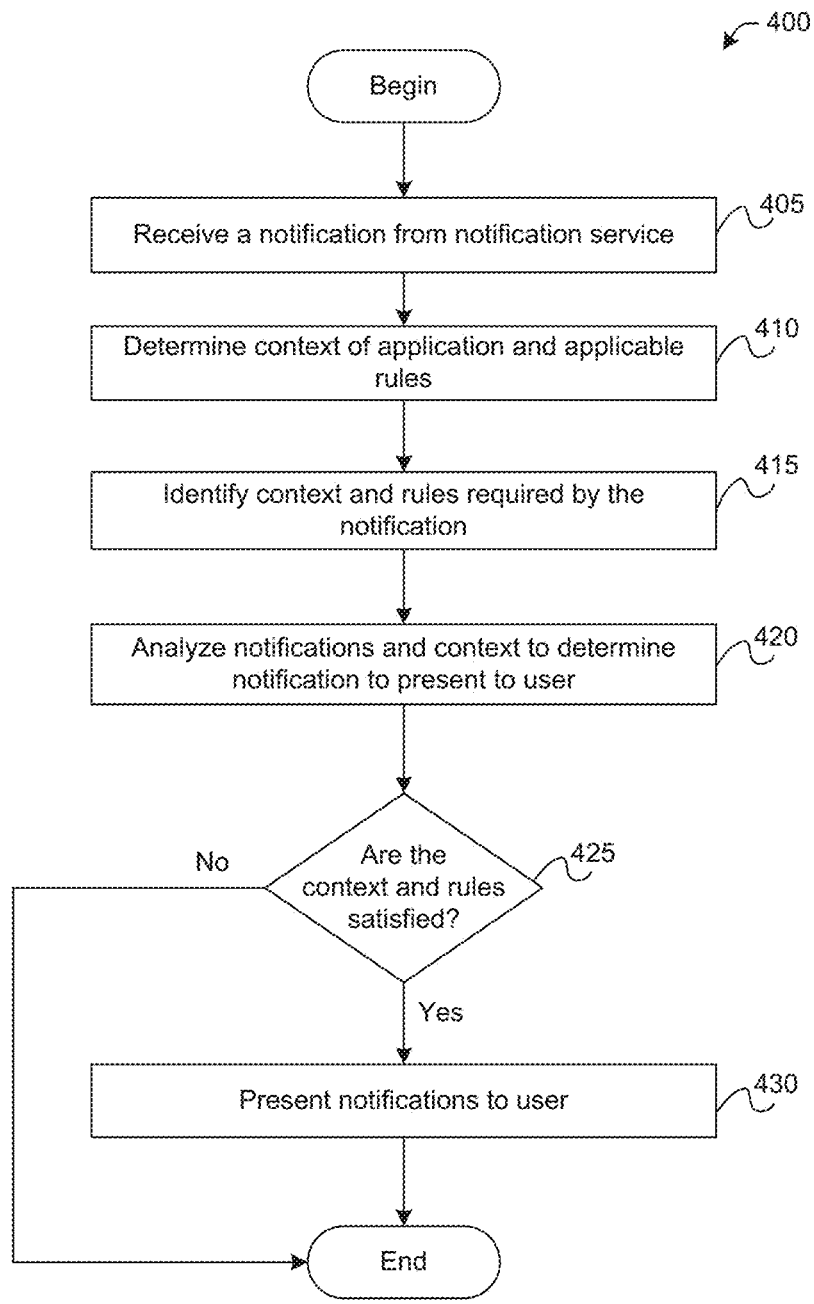
FIG. 4 illustrates a method for notifying a user, according to one embodiment.

FIG. 4 illustrates a method 400 for notifying a user, according to one embodiment. As shown, method 400 begins at step 405 where a desktop application receives a notification message from a notification service located on a remote server. The notification message may include message data, context data, and rule data. The notification may be received in response to a request sent to the remote server by a notification component in the application.

At step 410, a context collection component determines a current context of the application and a rule collection component determines one or more applicable rules. For example, the context collection component may determine a current page open in the application or a particular form visible to the user of the application. A rule may specify a particular operating system, a particular version of an operating system executing on a client computer, a certain region or area in which a user is located, etc. The rule collection component may obtain information related to the rules and determine one or more rules that are satisfied.

At step 415, based on the contents of the notification message, a context validation engine identifies a context of the application and a rule validation engine identifies one or more rules required by the notification. For example, the context validation engine may identify a particular tax form that the notification requires to be open in the application before the notification can be displayed to the user. Similarly, the rule validation engine may, for example, identify a particular version of an operating system that the notification requires to be executing on the client computer before the notification can be displayed to the user.

At step 420, the context validation engine compares the current context of the application to the context required by the notification. Similarly, the rule validation engine compares the applicable rules to the one or more rules required by the notification. If the current context of the application satisfies the context required by the notification and the applicable rules satisfy the rules required by the notification at step 425, the notification component sends the notification to the notification dashboard which displays the notification to the user at step 430. If the context of the application or the applicable rules does not satisfy the requirements of the notification, the notification is not displayed to the user. In one embodiment, if the notification is not displayed to the user, steps 410 to 425 may be repeated by the application.

Figure 5:
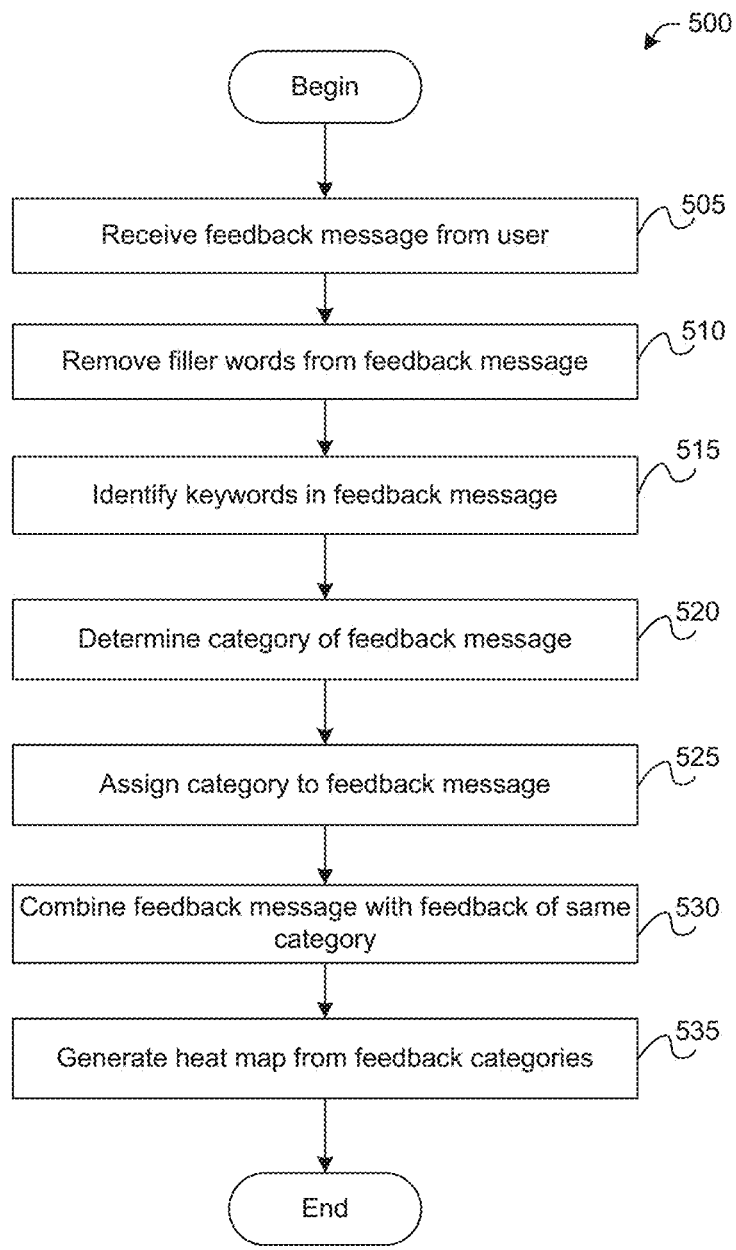
FIG. 5 illustrates a method for generating a heat map based on user feedback, according to one embodiment.

FIG. 5 illustrates a method 500 for generating a heat map based on user feedback, according to one embodiment. As shown, method 500 begins at step 505 where a feedback dashboard receives a feedback message from a user. The feedback dashboard also receives a context of the application at the time the message was sent and rules applicable to the feedback message. At step 510, a natural language processor may remove any filler words. The filler words may include indefinite articles, definite articles, pronouns, and conjunctions.

Before removing the filler words, the natural language processor may translate the feedback message to a common language. For example, if the feedback message is in French, the natural language processor may translate the message to English. At step 515, the natural language processor identifies keywords in the feedback message. The keywords may include the remaining words of the feedback message after the filler words are removed. At step 520, a pattern matching engine may determine a category of the feedback message based on the keywords, context of the application at the time the message was sent, and the rules applicable to the message.

At step 525, the pattern matching engine assigns the feedback message to the determined category. At step 530, a heat map generator combines the feedback message with other feedback messages assigned to the same category. The heat map generator then creates a heat map based on the categories and a number of feedback messages assigned to each category at step 535.

FIG. 6 illustrates a first level of a feedback dashboard 600 based on user feedback, according to one embodiment. The first level view of the feedback dashboard 600 shows a visualization of feedback messages received from users of the application in a heat map 610. The heat map 610 may be created by a heat map generator executing on a server computer.

As shown, the first level of a feedback dashboard 600 includes view options 605 and the heat map 610. The view options 605 may be used by the developer to change the visualization of the heat map 610. For example, as shown in FIG. 6, the developer can view the heat map 610 based on the overall application. The developer can change the view of the heat map 610 by clicking on one of the view options 605. For example, if the developer clicks on the "Form" view option, a heat map can be viewed where each block of the heat map corresponds to a different form within the application.

Each block in the heat map 610 represents a category to which feedback messages are assigned. A color and a size of a given block in the heat map 610 may indicate a number of feedback messages assigned to the category which corresponds to that block. A developer can click on each block of the heat map 610 to see a more detailed view of the feedback messages and keywords associated with that category. If the developer clocks on the block "CRA EFile," a heat map can be viewed where each block corresponds to more detailed categories related to "CRA EFile" as shown in FIG. 7.

A feedback message may be assigned to the "CRA EFile" category based on a context of that application when the user submits the feedback message. For example, if the user is working on a CRA EFile form, the context of the application may be "CRA EFile." Based on the context, that feedback message may be assigned to the "CRA EFile" category. The feedback message may also be assigned to the "CRA EFile" category based on keywords within the feedback message. For example, if the user submits a feedback message which contains the phrase "CRA EFile," the pattern matching component may assign the message to the CRA EFile category.

FIG. 7 illustrates a second level of a feedback dashboard 700 based on user feedback, according to one embodiment. As shown, the second level of the feedback dashboard 700 includes view option 605 and a heat map 710 showing categories related to a "CRA EFile" category. Each block of the heat map 710 corresponds to a more detailed category of feedback messages related to "CRA EFile." For example, a user may submit a feedback message while working on a "CRA EFile" form. Thus, the message may be assigned to the "CRA EFile" category.

Based on keywords within the feedback message and a field context (e.g., a field of the "CRA EFile" form in which the user was working when the message was submitted), the pattern matching component may determine that the message is related to validation error within the "CRA EFile" form. In that case, the message may be assigned to the "Missing Validation" category within the "CRA EFile" as shown in the second level of the feedback dashboard 700.

The feedback message may further be assigned to a "Tax code error" sub-category within the "Missing Validation" category. The heat map 710 may indicate a number of messages related to each sub-category within the "Missing Validation" category. For example, as shown in the heat map 710, the feedback dashboard received 107 feedback messages which are currently assigned to the "Tax code error" sub-category.

The feedback dashboard may provide a mechanism for a developer to select a sub-category from the heat map 710 and begin a question and answer session with each user who submitted a feedback message assigned to that sub-category. For example, as shown, a developer may select the "Tax code error" sub-category. In that case, the feedback dashboard may begin a question and answer sessions with all 107 users that submitted a message assigned to that sub-category. This may facilitate a faster response time to a particular feedback message because a developer can address related issues from multiple users at one time.

Figure 8:
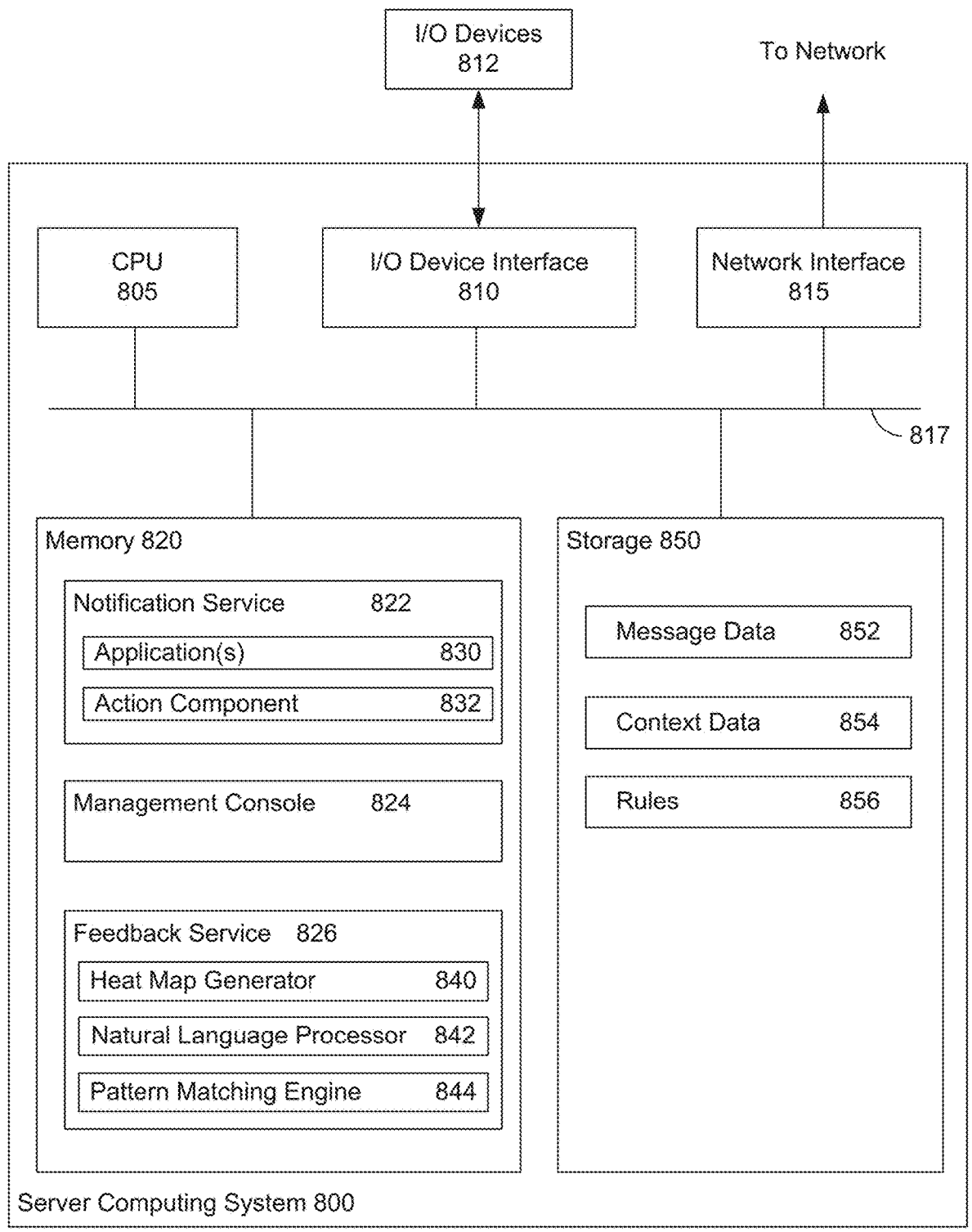
FIG. 8 illustrates an example computing system configured to notify users based on a context, according to one embodiment.

FIG. 8 illustrates an example computing system 800 configured to notify users based on a context, according to one embodiment. As shown, the computing system 800 includes, without limitation, a central processing unit (CPU) 805, a network interface 815, a memory 820, and storage 850, each connected to a bus 817. The computing system 800 may also include an I/O device interface 810 connecting I/O devices 812 (e.g., keyboard, display, mouse devices, image capture devices, etc.) to the computing system 800. Further, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stored in the storage 850. The bus 817 is used to transmit programming instructions and application data between the CPU 805, I/O device interface 810, storage 850, network interface 815, and memory 820. Note, CPU 805 is included to be representative of a single CPU, multiple CPUs, a single CPU having multiple processing cores, and the like, and the memory 820 is generally included to be representative of a random access memory. The storage 850 may be a disk drive or flash storage device. Although shown as a single unit, the storage 850 may be a combination of fixed and/or removable storage devices, such as fixed disc drives, removable memory cards, optical storage, network attached storage (NAS), or a storage area-network (SAN). As shown, storage 850 includes message data 852, context data 854 and rules 856.

Illustratively, the memory 720 includes a notification service 822 including one or more applications 830 and an action component 832, a management console 824, and a feedback service 826 including a heat map generator 840, a natural language processor 842, and a pattern matching engine 844. In certain aspects, these components may correspond to the components of the server computer described with reference to FIG. 2.

Upon receiving a request for a notification, the notification service 822 may send one or more notifications to an application. The action component 832 may determine an action to be taken based on the notification. For example, a notification indicating an updated version of the application may include an action to download and update the software. The management console 824 may be used by a developer of the application to generate one or more notifications. The notification service 822 may store the notification in storage 850. A notification may include message data, context data, and rules, each of which may be stored in message data 852, context data 854, and rules 856, respectively. The message data may contain the content of the message to be presented to the user. The context data for a given notification may include a context of the application in which the application is displayed to the user. The rules for a given notification may include specific criteria in which the notification can be displayed to the user.

The feedback service 826 may receive a feedback message from a user of the application. The feedback message may include a context of the application at the time the feedback message was submitted. The natural language processor 842 may remove filler words from the feedback message, such as indefinite articles, definite articles, pronouns, conjunctions, etc.

The natural language processor 842 may also identify keywords remaining in the message. Based on the keywords and context of the application, the pattern matching engine 844 may determine a category to which the feedback message is assigned.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowcharts and block diagrams in the figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for managing user feedback, the method comprising:
   receiving a feedback message and application context data associated with the feedback message, wherein the application context data was obtained by an application at a time when a user provided the feedback message;
   identifying a category, from a plurality of categories, related to the feedback message based on a content of the feedback message and the application context data associated with the feedback message;
   aggregating the feedback message with a plurality of feedback messages from a plurality of users;
   determining a number of feedback messages assigned to each category of the plurality of categories from the aggregated feedback messages;
   displaying, in a feedback dashboard, output based on the number of feedback messages assigned to each category of the plurality of categories;
   receiving a selection of a given section of the output that represents a given category of the plurality of categories; and
   initiating, in response to the selection, a question and answer session in a chat window with at least one user of the plurality of users that submitted a given feedback message of the plurality of feedback messages that is associated with the given category.

2. The method of claim 1, wherein the output comprises a visualization of the number of feedback messages assigned to each category of the plurality of categories.

3. The method of claim 1, wherein each of the plurality of categories indicates an error associated with the application.

4. The method of claim 1, wherein identifying a category related to the feedback message comprises:
   translating the feedback message to a common language;
   modifying the feedback message by removing filler words from the feedback message; and
   identifying one or more keywords based on the modified feedback message.

5. The method of claim 4, wherein the content of the feedback message includes the one or more keywords in the feedback message.

6. The method of claim 1, further comprising displaying a notification based on at least one of:
   the application;
   a page within the application; and
   a field within the page.

7. The method of claim 6, wherein the notification is displayed based on a rule, wherein the rule specifies at least one of:
   an operating system in which the application is executing;
   a version of the operating system
   a region in which the user is located;
   a type of form worked on by the user;
   a type of business related to the type of form; and
   an extent of revenue of the business.

8. A non-transitory computer-readable storage medium storing instructions, which, when executed on a processor, perform an operation to manage user feedback, the operation comprising:
   receiving a feedback message and application context data associated with the feedback message, wherein the application context data was obtained by an application at a time when a user provided the feedback message;

identifying a category, from a plurality of categories, related to the feedback message based on a content of the feedback message and the application context data associated with the feedback message;

aggregating the feedback message with a plurality of feedback messages from a plurality of users;

determining a number of feedback messages assigned to each category of the plurality of categories from the aggregated feedback messages;

displaying, in a feedback dashboard, output based on the number of feedback messages assigned to each category of the plurality of categories;

receiving a selection of a given section of the output that represents a given category of the plurality of categories; and initiating, in response to the selection, a question and answer session in a chat window with at least one user of the plurality of users that submitted a given feedback message of the plurality of feedback messages that is associated with the given category.

9. The non-transitory computer-readable storage medium of claim 8, wherein the output comprises a visualization of the number of feedback messages assigned to each category of the plurality of categories.

10. The non-transitory computer-readable storage medium of claim 8, wherein each of the plurality of categories indicates an error associated with the application.

11. The non-transitory computer-readable storage medium of claim 8, wherein identifying a category related to the feedback message comprises:

translating the feedback message to a common language;

modifying the feedback message by removing filler words from the feedback message; and identifying one or more keywords based on the modified feedback message.

12. The non-transitory computer-readable storage medium of claim 11, wherein the content of the feedback message includes the one or more keywords in the feedback message.

13. The non-transitory computer-readable storage medium of claim 8, further comprising displaying a notification based on at least one of:

the application;

a page within the application; and a field within the page.

14. The non-transitory computer-readable storage medium of claim 13, wherein notification is displayed based on a rule, wherein the rule specifies at least one of:

an operating system in which the application is executing;

a version of the operating system a region in which the user is located;

a type of form worked on by the user;

a type of business related to the type of form; and an extent of revenue of the business.

15. A system, comprising:

a processor; and a memory hosting an application, which, when executed on the processor, performs an operation to manage user feedback, the operation comprising:

receiving a feedback message and application context data associated with the feedback message, wherein the application context data was obtained by an application at a time when a user provided the feedback message;

identifying a category, from a plurality of categories, related to the feedback message based on a content of the feedback message and the application context data associated with the feedback message;

aggregating the feedback message with a plurality of feedback messages from a plurality of users;

determining a number of feedback messages assigned to each category of the plurality of categories from the aggregated feedback messages;

displaying, in a feedback dashboard, output based on the number of feedback messages assigned to each category of the plurality of categories;

receiving a selection of a given section of the output that represents a given category of the plurality of categories; and initiating, in response to the selection, a question and answer session in a chat window with at least one user of the plurality of users that submitted a given feedback message of the plurality of feedback messages that is associated with the given category.

16. The system of claim 15, wherein the output comprises a visualization of the number of feedback messages assigned to each category of the plurality of categories.

17. The system of claim 15, wherein each of the plurality of categories indicates an error associated with the application.

18. The system of claim 15, wherein identifying a category related to the feedback message comprises:

translating the feedback message to a common language;

modifying the feedback message by removing filler words from the feedback message; and identifying one or more keywords based on the modified feedback message.

19. The system of claim 18, wherein the content of the feedback message includes the one or more keywords in the feedback message.

20. The system of claim 15, further comprising displaying a notification based on at least one of:

the application;

a page within the application; and a field within the page.

* * * * *